United States Patent [19]
Brown

[11] Patent Number: 5,819,690
[45] Date of Patent: Oct. 13, 1998

[54] TREAT-DISPENSING BALL

[75] Inventor: David G. Brown, South Windsor, Conn.

[73] Assignee: Stelaur Products, LLC, South Windsor, Conn.

[21] Appl. No.: 851,669

[22] Filed: May 6, 1997

[51] Int. Cl.⁶ .................................................. A01K 29/00
[52] U.S. Cl. .......................................... 119/707; 119/710
[58] Field of Search .................................... 119/707, 709, 119/710, 711; 446/409, 419, 431; 473/594, 163

[56] References Cited

U.S. PATENT DOCUMENTS

| | | |
|---|---|---|
| 693,821 | 2/1902 | De Ford . |
| 1,006,182 | 10/1911 | Cousin . |
| 1,022,112 | 4/1912 | Smith . |
| 1,534,964 | 4/1925 | Kaknweiler . |
| 1,684,557 | 9/1928 | Saunders . |
| 2,086,631 | 7/1937 | Munro ................................ 272/86 |
| 3,427,320 | 2/1969 | Ward ................................ 273/176 |
| 3,519,273 | 7/1970 | Viby ................................ 273/128 |
| 3,948,220 | 4/1976 | Fiedler . |
| 3,999,519 | 12/1976 | Rodemeyer ........................ 119/29 |
| 4,008,526 | 2/1977 | Swett et al. . |
| 4,448,418 | 5/1984 | McNeill ............................. 273/123 A |
| 4,451,038 | 5/1984 | Nagy . |
| 4,727,825 | 3/1988 | Houghton .......................... 119/29 |
| 4,840,374 | 6/1989 | Skinner . |
| 4,841,911 | 6/1989 | Houghton .......................... 119/29 |
| 4,930,776 | 6/1990 | Newcomb et al. . |
| 5,003,925 | 4/1991 | Roberts ............................. 119/51.04 |
| 5,009,193 | 4/1991 | Gordon ............................. 119/29 |
| 5,139,453 | 8/1992 | Aiken et al. ....................... 446/75 |
| 5,213,232 | 5/1993 | Kraft et al. ........................ 221/277 |
| 5,232,130 | 8/1993 | Woodard ........................... 222/454 |
| 5,280,906 | 1/1994 | Vitale . |
| 5,343,828 | 9/1994 | Houghton et al. ................ 119/51.03 |
| 5,351,650 | 10/1994 | Graves ............................. 119/707 |

*Primary Examiner*—Robert P. Swiatek
*Assistant Examiner*—James S. Bergin
*Attorney, Agent, or Firm*—Ira S. Dorman

[57] ABSTRACT

A treat-discharging roll toy is formed as a hollow body having at least two openings into its interior cavity, and having at least two deflector members, of functionally solid geometric form, that project from the inner surface of the body at locations proximate the openings. The toy is loaded with animal treats, such as artificial bones or other hard formed objects (normally edible), which are randomly discharged as the toy is rolled; the deflector structures orient the treats and promote movement toward the openings.

18 Claims, 2 Drawing Sheets

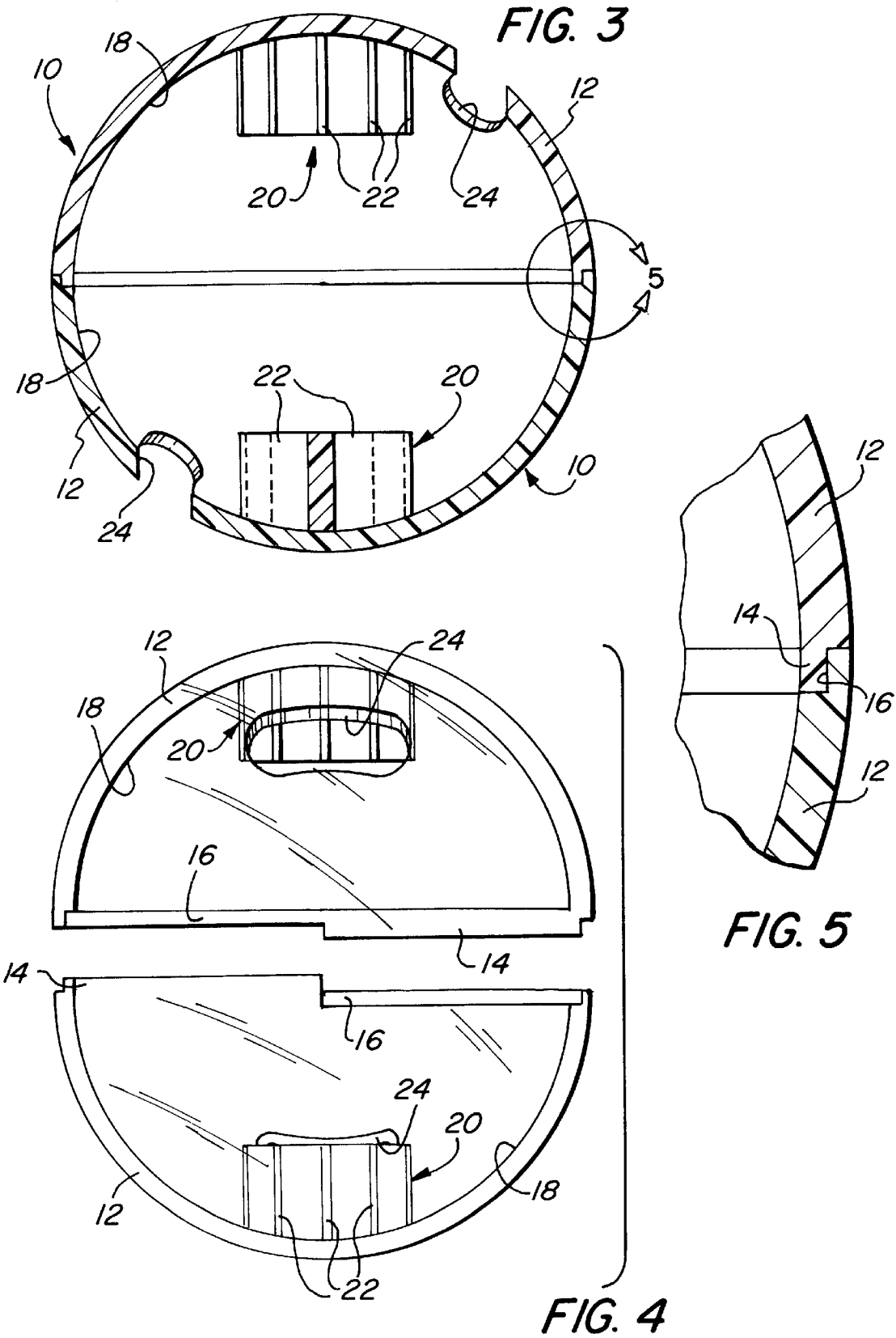

TREAT-DISPENSING BALL

BACKGROUND OF THE INVENTION

The prior art provides pet toys that dispense substances when the toy is rolled or otherwise manipulated; catnip-containing toys are disclosed, for example, in U.S. Pat. Nos. 1,006,182 and 2,086,631. Similarly, U.S. Pat. No. 1,534,964 provides a hollow ball that contains an artificial catnip mouse, sized to pass only partially through slots provided, and U.S. Pat. No. 5,343,828 provides a hollow sphere having slots configured for the passage of pellets of foods or other substances.

Hollow balls and the like having a variety of forms and arrangements of holes and openings are disclosed in U.S. Pat. Nos. 1,684,557, 3,427,030, 4,008,526, 4,930,776 and 5,280,906. A cat toy having an inner ball is provided by U.S. Pat. No. 5,351,650, and animal-feeding dispensers, having deflecting elements, are shown in U.S. Pat. Nos. 3,948,220, 3,999,519, 5,003,925, 5,213,232, and 5,232,130. Object-containing and receiving devices, games, and toys are described in U.S. Pat. Nos. 4,451,038, 4,727,825, 4,840,374, 4,841,911, and 5,139,453.

Despite the activity in the art indicated by the fore-going, a need remains for a roll toy that is effective for discharging animal treats at random but relatively frequent intervals, which toy is incomplex and relatively facile and inexpensive to manufacture.

SUMMARY OF THE INVENTION

Accordingly, the general object of the present invention to provide a novel roll toy for an animal, which is so constructed that the treats contained within the toy are discharged at random but relatively frequent intervals, and which is incomplex and relatively inexpensive and facile to manufacture.

It has now been found that the foregoing and related objects of the invention are attained by the provision of a treat-discharging roll toy comprised of a wall, forming a hollow body configured for rolling and defining an interior cavity and a plurality of mutually spaced openings therein, the openings being dimensioned and configured for passage of animal treats into and out of the cavity. A plurality of deflector members, of functionally solid geometric form, are fixed on the wall and project into the cavity. Each of the deflector members is disposed proximate one of the openings, and serves to deflect loose animal treats, contained in the body cavity, toward the proximate opening during rolling movement of the toy.

The body of the toy will usually consist of two separately formed, and preferably identical, components secured together. Most desirably, each of the body components will include a wall portion and at least one deflector member, with the wall portion and deflector member being integrally formed, as a single piece. The deflector member will advantageously comprise an array of fin elements extending from a central location. In an especially desirable form of deflector member, all of the fin elements will be substantially identical and will extend radially from the central location, thereby affording to the deflector member an effectively cylindrical configuration.

The body of the toy will normally have a central axis on which two deflector members are disposed, and it will in most instances be spherical. Most desirably, there will be only two wall openings, and they will be of straight-sided oval configuration and substantially identical; the body wall will usually be of substantially uniform thickness throughout.

BRIEF DESCRIPTION OF THE DRAWINGS

FIG. 3 is a sectional view of the toy, taken along line 3—3 of FIG. 2;

FIG. 4 is an exploded elevational view, depicting the two hemispheres of which the toy is constructed; and FIG. 5 is a fragmentary view, taken at the section designated 5 in FIG. 3, drawn to a greatly enlarged scale.

DETAILED DESCRIPTION OF THE PREFERRED AND ILLUSTRATED EMBODIMENTS

Figure 1:
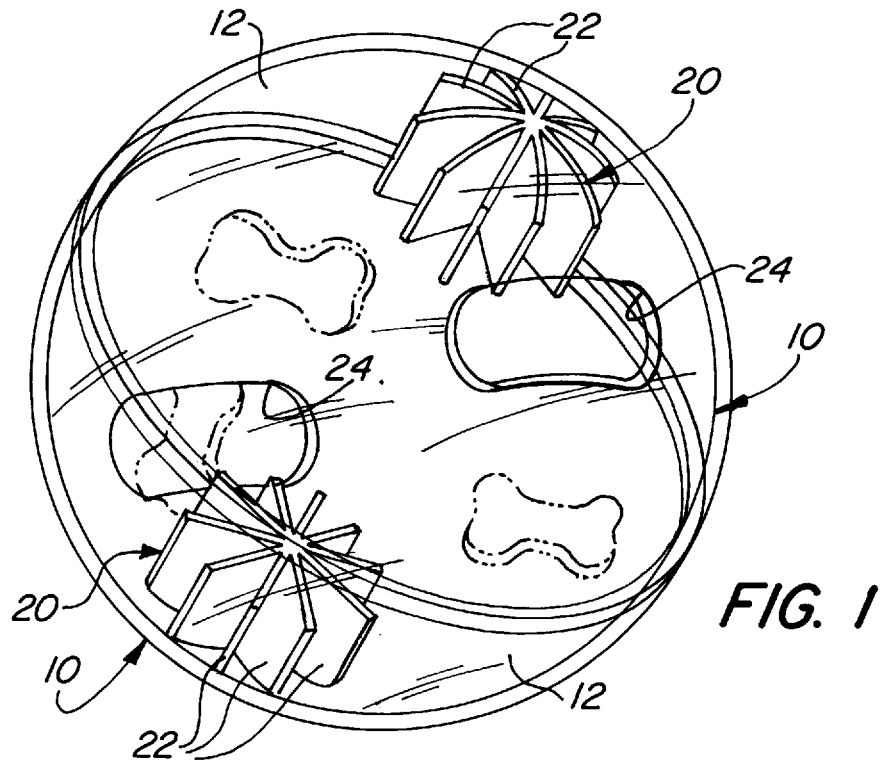
FIG. 1 is an isometric view showing a roll toy embodying the present invention.
Figure 2:
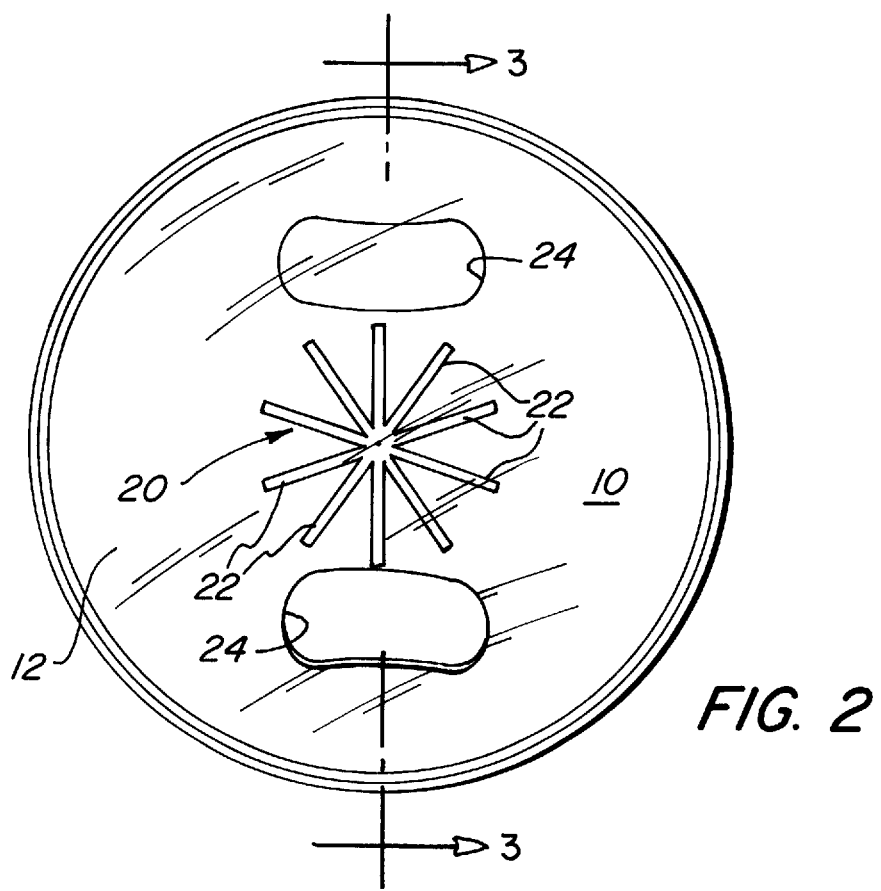
FIG. 2 is a plan view of the toy of FIG. 1.

Turning now in detail to the appended drawings, therein illustrated is a roll toy embodying the present invention and constructed from two hemispherical components, each generally designated by the numeral 10. Since the components 10 are identical, description of one of them will, by-and-large, suffice.

More particularly, each hemispherical component 10 is comprised of a wall portion 12 having an edge on which is formed a tongue element and a groove element 14, 16 respectively, each extending half way around the mouth of the recess 18 defined within the hemisphere. It will be appreciated that the tongue elements 14 are dimensioned and configured to mate with the groove elements 16, so that when the two constituent components 10 are assembled, in the orientation dictated by the elements 14, 16, their features will be disposed in proper relationships to one another.

An effectively cylindrical deflector member, generally designated by the numeral 20, is integrally formed on the central axis of the wall portion 12 of each hemisphere 10, and projects into the recess 18 defined. Each deflector member consists of an array of radially extending fins or vanes 22, the free outer edges of which lie on an imaginary cylindrical surface. In the spherical body (ball) that results from assembly of the components 10, the deflector members project toward one another, on a diametric axis, into the cavity formed by the cooperating recesses 18.

Proximate each of the deflector structures 20 is a straight-sided oval opening 24 in the wall portion 12. In the embodiment illustrated, the toy is particularly adapted to contain and discharge artificial bones (of the typical shape suggested in phantom line, in FIG. 1), which can pass through the openings 24 only in certain orientations. The deflecting structures 20 direct, and induce reorientation of, the artificial bones, and thereby promote release of treats intermittently through the openings 24 as the toy is rolled, randomly but at relatively frequent intervals.

As will be appreciated by those skilled in the art, the described construction will facilitate production of the toy, usually made of plastic, and will render manufacture relatively inexpensive. Because the components of the toy are identical they can both be produced from the same mold. Moreover, the deflecting structure is such that it can be formed integrally with the wall portion of the component, the thin fin arrangement described ensuring rapid cool-down of the molded plastic without undue distortion, and also facilitating ready release of the part from the mold. The formed hemispherical components may be secured to one another by any suitable means, such as adhesive bonding, plastic welding, or the like, and it will be appreciated that they will normally be permanently affixed, with loading of treats being readily achieved by introducing them through the openings 24.

In the most preferred embodiments, the toy will take the form of a sphere having a diameter of about 4½ to 10 inches, with straight-sided oval openings. In the 4½ inch diameter ball, the openings will usually measure about 1⅛ to 1⅜ inch in length and ½ to ⅝ inch in width; the deflector will, in such embodiments, usually have a diameter of about 1¼ to 1½ inch and a height of about ⅞ to 1⅛ inch, with the fins being separated by about ¼ inch or less at free ends (to prevent entry of the treat therebetween, thereby enabling the structure to function like a solid cylindrical member). In 7 to 10 inch diameter versions of the ball, the openings will usually measure about 1⅜ to 1⅞ inch in length and 9/16 to 13/16 in width, and the deflector will usually have a diameter of about 1⅜ to 2 inches and a height of about 1¼ to 1¾ inches; the separation at the ends of the fins will desirably be ⅝ inch or less (it being assumed that a larger treat will be used in the larger models). Depending upon the other dimensions, at the point of minimum separation the deflector will usually lie about ¼ to 1 inch from the proximate opening, albeit that a separation in the range ½ to ¾ inch will often produce the most desirable effect.

While a spherical toy for dispensing bone-shaped treats has been illustrated, it will be appreciated that the toy and the treats may take many different forms without departure from the concepts of the present invention. It will also be appreciated that the selection of optimal dimensions will depend upon the particular form of the toy and of the treat product that is employed with it. The toy will however normally have a circular external contour, at least in all planes that are perpendicular to a central axis, to facilitate rolling (it may, for example, be of generally elliptical cross section). The inside surface will usually also be of regular spheric contour, albeit that external and internal irregularities (the latter being in addition to the deflecting structures described) may be present if the toy will, as a result, be rendered more effective for its intended purposes.

The shape and number of the openings provided may of course vary from the illustrated embodiment, depending in large measure upon the nature of the treat that is to be dispensed. Two openings have been found to provide a level of intermittent reward sufficient to maintain the interest of a dog. The construction and configuration of the deflecting structures, as well as the number of such members provided, may also vary considerably from the illustrated embodiment; the deflectors should, in any event, have a functionally solid geometric form (albeit that they may be comprised of radial vane elements, as illustrated) which, in a body of circular cross section, is desirably also of circular cross section in the same planes. For the reasons described, the depicted structure and arrangement of openings and deflectors is presently regarded to constitute the best mode of carrying the invention into practice, as conceived for dispensing artificial bone-shaped treats from a ball-like toy. Finally, although a transparent or translucent plastic will usually be used for molding the components, other materials and fabrication techniques may be employed, if so desired.

Thus, it can be seen that the present invention provides a novel roll toy for an animal, which is so constructed that the treats contained within the toy are discharged at random but relatively frequent intervals, and which is incomplex and relatively inexpensive and facile to manufacture.

Having thus described the invention, what is claimed is:

1. A treat-discharging roll toy for an animal, comprising a wall forming a hollow body configured for rolling and defining an interior cavity and a plurality of mutually-spaced openings, said openings being dimensioned and configured for passage of animal treats into and out of said cavity through said wall; and a plurality of mutually spaced deflector members projecting into said cavity from said wall and being so formed and located as to extend along only a minor portion of said wall, each of said deflector members being disposed proximate an associated one of said wall openings for deflecting loose animal treats, contained in said body cavity, toward said associated wall opening during rolling movement of said toy.

2. The toy of claim 1 wherein said body consists of two separately formed body components, secured together.

3. The toy of claim 2 wherein said components are substantially identical.

4. The toy of claim 2 wherein each of said body components includes a wall portion and at least one of said deflector members, said wall portion and deflector member 96 being integrally formed, as a single piece.

5. The toy of claim 4 wherein said deflector member has a longitudinal axis and comprises an array of fin elements extending laterally outwardly in a multiplicity of directions from about, and taken with reference to, said longitudinal axis, the outer ends of said fin elements providing lateral contact elements on said deflector member.

6. The toy of claim 5 wherein said fin elements are all substantially identical and extend radially, with reference to said longitudinal axis, the outer ends of said fin elements cooperatively affording to said deflector member an effectively cylindrical exterior configuration.

7. The toy of claim 1 wherein said body has a central axis and said deflector members have longitudinal axes, said longitudinal axes of two of said deflector members being disposed on said central axis.

8. The toy of claim 1 wherein said body is spherical.

9. The toy of claim 1 wherein said openings are of straight-sided oval configuration.

10. The toy of claim 1 wherein all of said openings are substantially identical.

11. The toy of claim 1 wherein said wall is of substantially uniform thickness throughout.

12. A treat-discharging roll toy for an animal, comprising a wall of uniform thickness forming a hollow spherical body about 4½ to 10 inches in diameter and defining an interior cavity and a plurality of mutually-spaced openings, said openings being of straight-sided oval configuration, and measuring about 1⅛ to 1⅞ inches in length and ½ to 13/16 inch in width, for passage of bone-shaped animal treats into and out of said cavity through said wall; and a plurality of mutually-spaced deflector members projecting into said cavity from said wall and each of said deflector members having an effectively cylindrical exterior contour and being disposed proximate an associated one of said wall openings for deflecting treats, contained in said body cavity, toward said associated wall opening during rolling movement of said toy.

13. The toy of claim 12 wherein said wall defines two of said openings and said toy has two of said deflector members.

14. The toy of claim 13 wherein each of said deflector members is about 1¼ to 2 inches in diameter and ⅞ to 1¾ inch high, and is disposed about ¼ to 1 inch from said associated wall opening.

15. The toy of claim 14 wherein each of said deflector members has a longitudinal axis and comprises an array of substantially identical fin elements extending radially from about, and taken with reference to, said longitudinal axis, the outer ends of said fin elements being spaced from one another by a spacing distance not exceeding ⅝ inch and affording to said deflector member an effectively cylindrical exterior configuration.

16. The toy of claim 15 wherein said body is about 4½ inches in diameter, said opening is about 1⅛ to b 1⅜ inches long and about ½ to ⅝ inch wide, said deflector member is about 1¼ to 1½ inches in diameter and about ⅞ to 1⅛ inches high, and said spacing distance does not exceed ¼ inch.

17. The toy of claim 15 wherein said body is about 7 to 10 inches in diameter, said opening is about 1⅜ to 1⅞ inches long and about 9/16 to 13/16 inch wide, and said deflector member is about 1⅜ to 2 inches in diameter and about 1¼ to 1¾ inches high.

18. The toy of claim 12 wherein said body consists of two separately formed body components, secured together, each of said body components including a wall portion and at least one of said deflector members, said wall portion and said at least one deflector member being integrally formed, as a single piece, to provide said each body component.

* * * * *

UNITED STATES PATENT AND TRADEMARK OFFICE
CERTIFICATE OF CORRECTION

PATENT NO. : 5,819,690
DATED      : October 13, 1998
INVENTOR(S) : DAVID G. BROWN It is certified that error appears in the above-indentified patent and that said Letters Patent is hereby corrected as shown below:

Claim 4, column 4, line 14, after the word "member" insert -- of said each body component --; line 15, delete the number "96".

Signed and Sealed this

Twenty-third Day of February, 1999

Attest:

Q. TODD DICKINSON

Attesting Officer    Acting Commissioner of Patents and Trademarks